United States Patent
Cho et al.

(10) Patent No.: US 7,276,959 B2
(45) Date of Patent: Oct. 2, 2007

(54) PUMPING CIRCUIT OF SEMICONDUCTOR DEVICE

(75) Inventors: Kwang Jun Cho, Seoul (KR); Keun Kook Kim, Chungcheongbuk-do (KR)

(73) Assignee: Hynix Semiconductor Inc., Gyunggi-do (KR)

( * ) Notice: Subject to any disclaimer, the term of this patent is extended or adjusted under 35 U.S.C. 154(b) by 178 days.

(21) Appl. No.: 11/046,128

(22) Filed: Jan. 28, 2005

(65) Prior Publication Data

US 2006/0097771 A1 May 11, 2006

(30) Foreign Application Priority Data

Nov. 5, 2004 (KR) ...................... 10-2004-0089970

(51) Int. Cl.
*H02M 3/18* (2006.01)
*G05F 3/16* (2006.01)

(52) U.S. Cl. .......................... 327/536; 363/60
(58) Field of Classification Search ...................... None
See application file for complete search history.

(56) References Cited

U.S. PATENT DOCUMENTS

| | | | |
|---|---|---|---|
| 6,160,723 A * | 12/2000 | Liu | 363/60 |
| 6,373,322 B2 * | 4/2002 | Kobayashi et al. | 327/536 |
| 6,456,513 B2 * | 9/2002 | Saito | 363/59 |
| 6,693,483 B2 * | 2/2004 | Deml et al. | 327/536 |
| 6,791,212 B2 * | 9/2004 | Pulvirenti et al. | 307/113 |

FOREIGN PATENT DOCUMENTS

| | | |
|---|---|---|
| KP | 10-0264959 | 6/2000 |
| KP | 10-0353541 | 9/2002 |
| KP | 10-2003-0002508 | 1/2003 |

* cited by examiner

*Primary Examiner*—Kenneth B. Wells
*Assistant Examiner*—Terry L. Englund
(74) *Attorney, Agent, or Firm*—Marshall, Gerstein & Borun LLP (57) ABSTRACT

A pumping circuit of a semiconductor device includes a power supply unit for supplying a power source voltage to a first node, a first transfer pump for transferring a first electric potential of the first node to a second node, a first pumping unit coupled to the first node for pumping the power source voltage applied to the first node, a first pump control unit for controlling a voltage applied to a gate of the first transfer pump, a second transfer pump for transferring a second electric potential of the second node to a high voltage output terminal, a second pumping unit coupled to the second node for selectively pumping the second electric potential of the second node, and a second pump control unit for controlling a voltage applied to a gate of the second transfer pump in response to the power source voltage level. If the power source voltage is higher than a predetermined voltage, the first pumping unit performs a pumping operation, and the second pumping unit performs only an on or off operation.

23 Claims, 3 Drawing Sheets

PUMPING CIRCUIT OF SEMICONDUCTOR DEVICE

BACKGROUND

1. Field of the Invention

The present invention relates to a pumping circuit of a semiconductor device, and more specifically, to a pumping circuit of a semiconductor device in which a first transfer pump and a second transfer pump perform one-step or two-step pumping operation to output a high voltage according to an externally applied voltage.

2. Discussion of Related Art

A high voltage generator is a device for supplying a constant high voltage Vpp to circuits within a chip, which requires a voltage higher than an externally applied voltage Vdd, in semiconductor memory devices. This high voltage generator is implemented by a charge pumping method.

In a dynamic random access memory (DRAM) being a kind of semiconductor memory devices, it is important to maintain a high voltage Vpp being the power source used in a core unit of the device over a predetermined level, and to reduce consumption of current. The high voltage Vpp that uses a level higher than that of an externally applied voltage Vdd obtains the electric potential of 2 to 3 times of the externally applied voltage Vdd through a charge pumping operation. In view of the core unit of the DRAM that is being used, the level of the high voltage Vpp is about 3.3V. It is required that the high voltage Vpp be produced regardless of the externally applied voltage. Therefore, when a low external voltage is applied, 3 times of the externally applied voltage can be obtained through twice pumping operations. For example, if the externally applied voltage Vdd is 1.5V, a pump having efficiency of 100% can pump the voltage up to 3.0V through once charge pumping operation. Thus, in an actual device having efficiency of below 100%, a voltage lower than 3.0V can be implemented. If a low external voltage is applied as such, the voltage is pumped in two steps to implement a target voltage of 3.0V or more.

In this pump, however, if an external applied voltage is over a given level, e.g., 2.5V, a two-step pumping operation is performed although the voltage can be pumped to 5.0V through once charge pumping operation. Thus, there are problems in that efficiency of the pump is lowered and consumption of the current increases.

SUMMARY OF THE INVENTION

Accordingly, the present invention has been made in view of the above problems, and it is an object of the present invention to provide a pumping circuit of the semiconductor device having low current consumption and high efficiency.

To achieve the above object, according to an aspect of the present invention, there is provided a pumping circuit of a semiconductor device, comprising a first transfer pump for transferring a voltage of a first node to a second node, a power supply unit for supplying a power source voltage to the first node, a first pumping unit for pumping the power source voltage applied to the first node, a first pump control unit for controlling a voltage applied to the gate of the first transfer pump, a second transfer pump for transferring the voltage of the second node to a high voltage output terminal, a second pumping unit for pumping the voltage applied to the second node, and a second pump control unit for controlling a voltage applied to the gate of the second transfer pump, wherein the first transfer pump and the second transfer pump performs a one-step or two-step pumping operation according to an externally applied voltage, thus outputting a high voltage.

If a power source voltage detected by a voltage level detector is lower than a predetermined voltage, the first transfer pump and the second transfer pump perform the two-step pumping operation without a voltage drop in the first transfer pump and the second transfer pump, thus outputting a high voltage to a high voltage output terminal, and if a power source voltage detected by the voltage level detector is higher than a predetermined voltage, the first transfer pump performs the one-step pumping operation without a voltage drop in the first transfer pump, and the second transfer pump performs only an on/off operation without a voltage drop, thus outputting a high voltage to the high voltage output terminal.

If a power source voltage detected by a voltage level detector is lower than a predetermined voltage, the power supply unit and the first pumping unit operate so that the first node has a voltage level, which is twice as high as the power source voltage, the first transfer pump transfers the voltage of the first node to the second node without a voltage drop under the control of the first pump control unit, the second pumping unit operates so that the second node has a voltage level, which is three times as high as the power source voltage, and the second transfer pump transfers the voltage of the second node to the high voltage output terminal without a voltage drop under the control of the second pump control unit, and if a power source voltage detected by the voltage level detector is higher than a predetermined voltage, the power supply unit and the first pumping unit operate so that the first node has a voltage level, which is twice as high as the power source voltage, the first transfer pump transfers the voltage of the first node to the second node without a voltage drop under the control of the first pump control unit, the second pumping unit does not perform a pumping operation, and the second transfer pump transfers the voltage of the second node to the high voltage output terminal without a voltage drop under the control of the second pump control unit.

An output terminal of the first pumping unit and an output terminal of the second pumping unit are set to have an opposite logic state of a voltage level.

An output terminal of the first pump control unit and an output terminal of the second pump control unit are set to have an opposite logic state of a voltage level.

The first transfer pump can comprise a driver having a drain terminal connected to the first node, a source terminal connected to the second node, and a gate terminal connected to an output terminal of the first pump control unit.

The second transfer pump can comprise a driver having a drain terminal connected to the second node, a source terminal connected to the output terminal, and a gate terminal connected to an output terminal of the second pump control unit.

The power supply unit can comprise a logic device for logically combining an inverted signal of the output signal of the ring oscillator and a signal, which is inverted from the output signal of the ring oscillator and delayed for a given time, a capacitor connected between an output terminal of the logic device and a third node, a first NMOS transistor connected between the power source voltage terminal and the third node, and a second NMOS transistor connected between the power source voltage terminal and the first node and having the gate connected to the third node. The logic device is a NOR gate.

The first NMOS transistor can be a diode having a gate terminal and a drain terminal connected to the power source voltage terminal.

The first pumping unit can comprise first to third inverters to which an output signal of a ring oscillator, which is inverted and delayed for a given time, is inputted, the first to third inverters being connected in a serial manner, and a capacitor connected to the first node and the output terminal of the third inverter.

The first pump control unit can comprise a first NMOS transistor connected between a ground voltage terminal and a third node, the first NMOS transistor being controlled according to a signal, which is delayed from an output signal of a ring oscillator for a given time, a second NMOS transistor connected between the power source voltage terminal and a fourth node and having the gate connected to the power supply unit, a third NMOS transistor connected between the power source voltage terminal and the third node and having a gate terminal connected to the power supply unit, a capacitor connected between the third node and the fourth node, a logic device for logically combining the output signals of the ring oscillator, an inverter connected between an output terminal of the logic device and the fifth node, and a capacitor connected between the third node and a fifth node. The first pump control unit can further comprise first and second inverters connected between a terminal to which the output signal of the ring oscillator is inputted and a gate terminal of the first NMOS transistor in a serial manner, and a third inverter connected between an output terminal of the second inverter and an input terminal of the logic device. The logic device is a NAND gate, and the NAND gate can receive an inverted signal of the output signal of the ring oscillator and a signal, which is inverted from the output signal of the ring oscillator and delayed for a given time, as the input.

The second pumping unit can comprise a logic device for receiving a signal, which is delayed from the output signal of the ring oscillator for a given time, and an inverted signal of a control signal, as the input, and a capacitor connected between an output terminal of the logic device and the second node. The second pumping unit can further comprise a first inverter for receiving a signal, which is inverted from the output signal of the ring oscillator and delayed for a given time, as the input, and then outputting the inverted and delayed signal to one input terminal of the logic device, and a second inverter for inverting the control signal and outputting the inverted control signal to the other input terminal of the logic device.

The second pump control unit can comprise a logic device for logically combining an inverted signal of the output signal of the ring oscillator and a signal, which is inverted from the output signal of the ring oscillator and delayed for a given time, an inverter for receiving the output signal of the logic device as the input, a first capacitor connected between an output terminal of the inverter and a third node, a first NMOS transistor connected between a power source voltage terminal and the third node and having the gate connected to an output terminal of the first pump control unit, a PMOS transistor connected between the third node and a fourth node, the PMOS transistor being controlled according to an inverted signal of the output signal of the ring oscillator, second and third NMOS transistors connected between a fourth node and a ground voltage terminal in a serial manner, wherein the second and third NMOS transistors are controlled according to the inverted signal of the output signal of the ring oscillator and a control signal, respectively, a second capacitor connected between the fourth node and a fifth node, and a fourth NMOS transistor connected between the second node and the fifth node and having the gate connected to an output terminal of the first pump control unit. The logic device is a NAND gate, and can receive a first signal, which is delayed from the output signal of the ring oscillator for a given time, and a second signal, which is more delayed than the first signal from the output signal of the ring oscillator, as the input.

The second pump control unit can comprise a logic device for logically combining an inverted signal of the output signal of the ring oscillator and a signal, which is inverted from the output signal of the ring oscillator and delayed for a given time, an inverter for receiving the output signal of the logic device as the input, a first capacitor connected between an output terminal of the inverter and a third node, a first NMOS transistor connected between a power source voltage terminal and the third node and having the gate connected to an output terminal of the first pump control unit, a PMOS transistor connected between the third node and a fourth node, the PMOS transistor being controlled according to a control signal, second and third NMOS transistors connected between the fourth node and a ground voltage terminal in a serial manner, wherein the second and third NMOS transistors are controlled according to a control signal and an inverted signal of the output signal of the ring oscillator, respectively, a second capacitor connected between the fourth node and a fifth node, and a fourth NMOS transistor connected between the second node and the fifth node and having the gate connected to an output terminal of the first pump control unit. The logic device is a NAND gate, and can receive a first signal, which is delayed from the output signal of the ring oscillator for a given time, and a second signal, which is more delayed than the first signal from the output signal of the ring oscillator, as the input.

DETAILED DESCRIPTION OF PREFERRED EMBODIMENTS

Now, the preferred embodiments according to the present invention will be described with reference to the accompanying drawings. Since preferred embodiments are provided for the purpose that the ordinary skilled in the art are able to understand the present invention, they may be modified in various manners and the scope of the present invention is not limited by the preferred embodiments described later.

Figure 1:
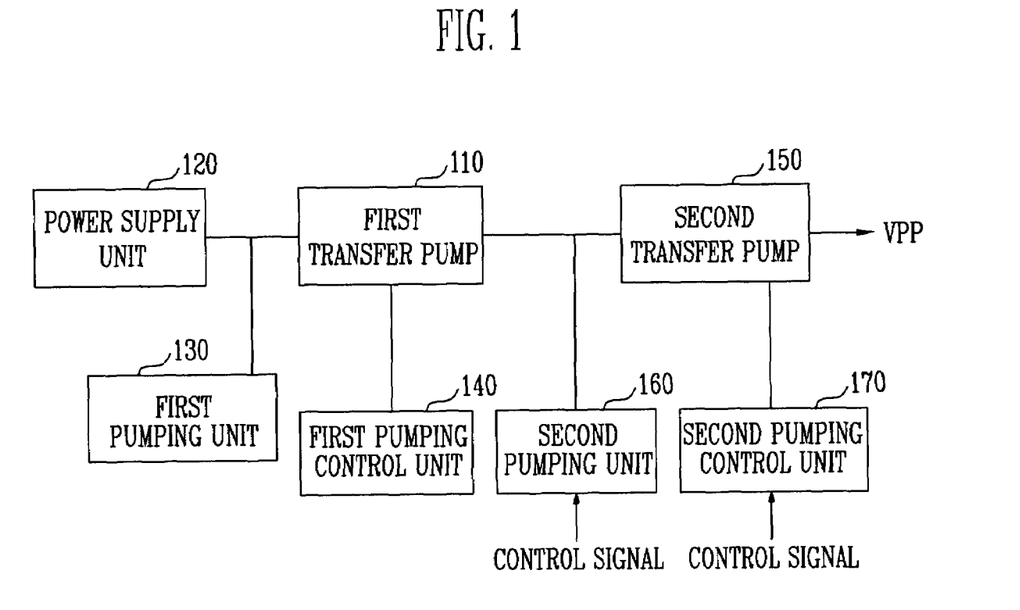
FIG. 1 is a block diagram showing a pumping circuit of a semiconductor device according to a preferred embodiment of the present invention.
Figure 2:
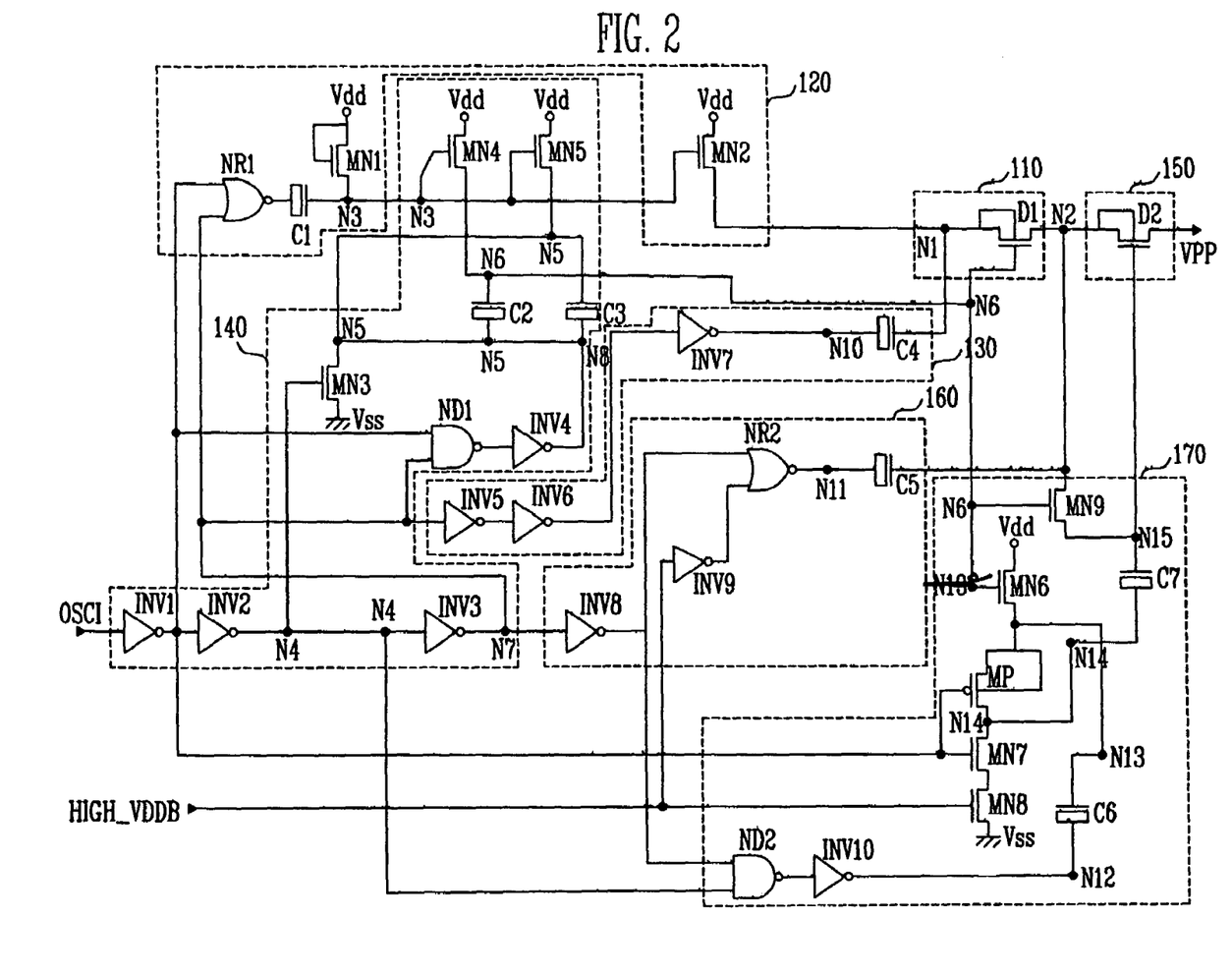
FIG. 2 is a circuit diagram showing a pumping circuit of a semiconductor device according to a first preferred embodiment of the present invention.
Figure 3:
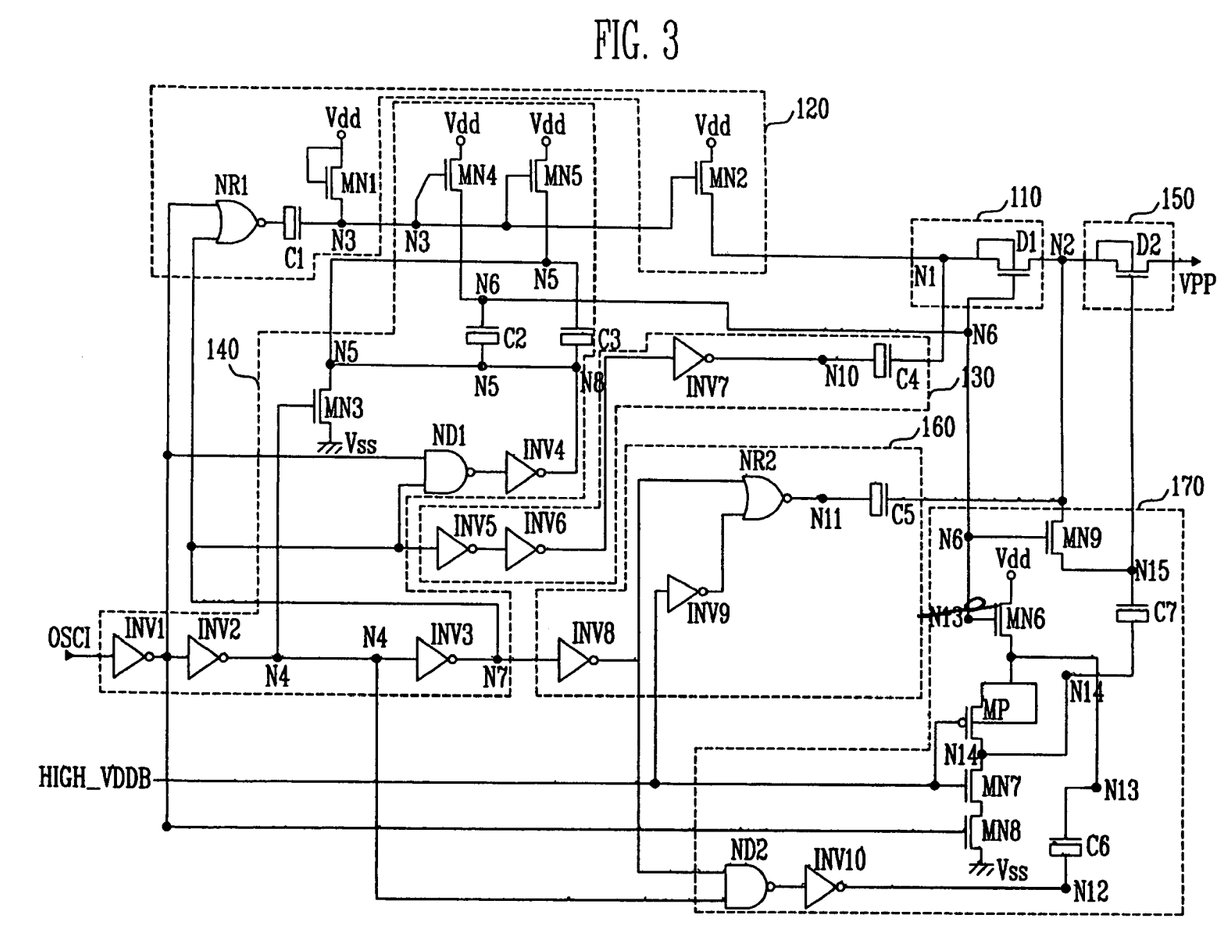
FIG. 3 is a circuit diagram showing a pumping circuit of a semiconductor device according to a second preferred embodiment of the present invention.

FIG. 1 is a block diagram showing a pumping circuit of a semiconductor device according to a preferred embodiment of the present invention. FIG. 2 is a circuit diagram showing a pumping circuit of a semiconductor device according to a first preferred embodiment of the present invention. FIG. 3 is a circuit diagram showing a pumping circuit of a semiconductor device according to a second preferred embodiment of the present invention.

The pumping circuit of the semiconductor device according to the first preferred embodiment of the present invention will now be described.

Referring to FIGS. 1 and 2, the pumping circuit according to the preferred embodiment of the present invention includes a first transfer pump 110, a power supply unit 120, a first pumping unit 130, a first pump control unit 140, a second transfer pump 150, a second pumping unit 160, a second pump control unit 170. The first transfer pump 110 transfers the potential of a first node N1 to a second node N2. The power supply unit 120 supplies a power source voltage Vdd to the first node N1 (the drain of the first transfer pump 110). The first pumping unit 130 pumps the power source voltage Vdd applied to the first node N1. The first pump control unit 140 controls the voltage applied to the gate of the first transfer pump 110. The second transfer pump 150 transfers the potential of the second node N2 to a high voltage output terminal VPP. The second pumping unit 160 pumps the voltage applied to the second node N2 (the drain of the second transfer pump 150). The second pump control unit 170 controls the voltage applied to the gate of the second transfer pump 150.

The first transfer pump 110 includes a driver D1, which is connected between the first node N1 and the second node N2 and has the gate connected to a node N6 being the output terminal of the first pump control unit 140. The drain terminal of the driver D1 is connected to the first node N1, and the source terminal thereof is connected to the second node N2.

The power supply unit 120 includes a logic device NR1 for logically combining an inverted signal of the output signal OSCI of the ring oscillator and a signal, which is inverted from the output signal OSCI of the ring oscillator and delayed for a given time, a capacitor C1 connected between the output terminal of the logic device NR1 and a node N3, a NMOS transistor MN1 connected between the power source voltage Vdd terminal and the node N3, and a NMOS transistor MN2, which is connected between the power source voltage Vdd terminal and the first node N1 and has the gate connected to the node N3. The logic device NR1 can be a NOR gate, and logically combines a signal, which is inverted from the output signal OSCI of the ring oscillator (a signal that is inverted from the output signal OSCI of the ring oscillator through an inverter INV1) and a signal, which is inverted from the output signal OSCI of the ring oscillator and delayed for a given time (a signal that is inverted from the output signal OSCI of the ring oscillator and delayed for a given time, through inverters INV1, INV2 and INV3).

The NMOS transistor MN1 can be a diode having a gate terminal and a drain terminal connected to the power source voltage Vdd terminal.

The power supply unit 120 supplies the power source voltage Vdd to the first node N1 according to a voltage level of the output signal OSCI of the ring oscillator.

The first pumping unit 130 includes inverters INV5, INV6 and INV7, which are connected in a serial manner, and a capacitor C4 connected between the first node N1 and a node N10 (the output terminal of the inverter INV7). The inverter INV5 receives a signal, which is inverted from the output signal OSCI of the ring oscillator and delayed for a given time, (a signal, which is inverted from the output signal OSCI of the ring oscillator and delayed for a given time, through the inverters INV1, INV2 and INV3), as the input.

The first pump control unit 140 includes the inverters INV1 and INV2, which are connected between a terminal to which the output signal OSCI of the ring oscillator is inputted and the node N4 in a serial manner, a NMOS transistor MN3 connected between a ground voltage Vss terminal and a node N5 and having the gate connected to the node N4, a NMOS transistor MN4 connected between the power source voltage Vdd terminal and a node N6 and having the gate connected to the node N3, a NMOS transistor MN5 connected between the power source voltage Vdd terminal and the node N5 and having the gate connected to the node N3, a capacitor C2 connected between the node N5 and the node N6, the inverter INV3 connected between the node N4 and a node N7, the logic device ND1 that logically combines an inverted signal of the output signal OSCI of the ring oscillator and a signal, which is inverted from the output signal OSCI of the ring oscillator and delayed for a given time, an inverter INV4 connected between the output terminal of the logic device ND1 and a node N8, and a capacitor C3 connected between the node N5 connected to NMOS transistor NM5 and a node N8. The logic device ND1 can be a NAND gate. The NAND gate logically combines an inverted signal of the output signal OSCI of the ring oscillator (a signal, which is inverted from the output signal OSCI of the ring oscillator through the inverter INV1) and a signal, which is inverted from the output signal OSCI of the ring oscillator and delayed for a given time (a signal, which is inverted from the output signal OSCI of the ring oscillator and delayed for a given time, through the inverters INV1, INV2 and INV3).

The second transfer pump 150 includes a driver D2 connected between the second node N2 and the high voltage output terminal VPP and having the gate connected to a node N15 that is the output terminal of the second pump control unit 170. The drain terminal of the driver D2 is connected to the second node N2, and the source terminal thereof is connected to the high voltage output terminal VPP.

The second pumping unit 160 includes an inverter INV8 that uses a signal, which is inverted from the output signal OSCI of the ring oscillator and delayed for a given time (a signal, which is inverted from the output signal OSCI of the ring oscillator and delayed for a given time, through the inverters INV1, INV2 and INV3), as the input, an inverter INV9 for inverting a control signal HIGH_VDDB, a logic device NR2 for receiving the output signal of the inverter INV8 and the output signal of the inverter INV9 as the input, and a capacitor C5 connected between the output terminal of the logic device NR2 and the second node N2. The logic device NR2 can be NOR gate. Meanwhile, a logic state of a voltage level of the output terminal of the second pumping unit 160, which is connected to the second node N2, is set to be opposite to that of a voltage level of the output terminal of the first pumping unit 130, which is connected to the first node N1. That is, if the output terminal of the first pumping unit 130 has a voltage of a HIGH level, the output terminal of the second pumping unit 160 is set to have a voltage of a LOW level. On the contrary, if the output terminal of the first pumping unit 130 has a voltage of a LOW level, the output terminal of the second pumping unit 160 is set to have a voltage of a HIGH level.

The second pump control unit 170 includes a logic device ND2 for logically combining an inverted signal of the output signal of the ring oscillator and a signal, which is inverted from the output signal of the ring oscillator and delayed for a given time, an inverter INV10 for receiving the output signal of the logic device ND2 as the input, a capacitor C6 connected between an output terminal N12 of the inverter INV10 and a node N13, a NMOS transistor MN6 connected between the power source voltage Vdd terminal and the node N13 and having the gate connected to a node N6 that is the output terminal of the first pump control unit 140, a PMOS transistor MP, which is connected between the node N13 and a node N14 and controlled according to an inverted signal of the output signal OSCI of the ring oscillator, NMOS transistors MN7, MN8 connected between the node N14 and the ground voltage Vss terminal, a capacitor C7 connected between the node N14 and a node N15, and a NMOS transistor MN9 connected between the second node N2 and the node N15 and having the gate connected to the node N6.

In the above, the NMOS transistor MN7 is controlled according to the inverted signal of the output signal OSCI of the ring oscillator (a signal, which is inverted from the output signal OSCI of the ring oscillator through the inverter INV1). The NMOS transistor MN8 is controlled according to the control signal HIGH_VDDB. The logic device ND2 can be a NAND gate. The NAND gate logically combines a signal, which is inverted from the output signal OSCI of the ring oscillator and delayed, through the inverters INV1, INV2 (an output signal of the inverter INV2), and a signal, which is delayed from the output signal OSCI of the ring oscillator for a given time through the inverters INV1, INV2, INV3 and INV8 (the output signal of the inverter INV8). Meanwhile, a logic state of a voltage level of the output terminal of the second pump control unit 170, which is connected to the gate of the second transfer pump 150, is set to be opposite to that of a voltage level of the output terminal of the first pump control unit 140, which is connected to the gate of the first transfer pump 110. That is, if the output terminal of the first pump control unit 140 has a voltage of a HIGH level, the output terminal of the second pump control unit 170 is set to have a voltage of a LOW level. On the contrary, if the output terminal of the first pump control unit 140 has a voltage of a LOW level, the output terminal of the second pump control unit 170 is set to have a voltage of a HIGH level.

The output signal OSCI of the ring oscillator is a pulse signal that is generated with a predetermined cycle. The control signal HIGH_VDDB is a signal, which is inputted as a HIGH level if an externally applied voltage is a low voltage (the externally applied voltage detected by a voltage level detector is below a predetermined voltage, for example, over 2.5V), and which is inputted as a LOW voltage if an externally applied voltage is a high voltage (the externally applied voltage detected by a voltage level detector is over a predetermined voltage, for example, below 2.5V).

If the externally applied voltage (the power source voltage Vdd) is a low voltage (the externally applied voltage detected by a voltage level detector is below a predetermined voltage, for example, below 2.5V), the control signal HIGH_VDDB is fixed to a HIGH level, so that the pumping circuit operates, the first node N1 has a voltage level of twice (2*Vdd) of the externally applied voltage by means of the charge pumping operation, and the gate of the driver D1, which is connected between the first node N1 and the second node N2, is applied with an oscillation voltage of three times (3*Vdd) of the externally applied voltage, so that the potential of the first node N1 is transferred to the second node N2 without a voltage drop in the driver D1. Further, the second node N2 is made to have a voltage level of 3*Vdd by means of once charge pumping operation, the gate of the driver D2, which is connected between the second node N2 and the high voltage output terminal VPP, is applied with an oscillation voltage of four times (4*Vdd) of the externally applied voltage, so that the potential of the second node N2 is transferred to the high voltage output terminal VPP without a voltage drop in the driver D2.

As described above, if the externally applied voltage is a low voltage, the pumping operation is sequentially performed twice, and the output voltage Vpp becomes a level of three times (3*Vdd) of the externally applied voltage.

Hereinafter, the operation of the pumping circuit when the externally applied voltage Vdd is a low voltage according to an embodiment of the present invention will be described in detail. It is assumed that a boosting ratio ($\alpha$) by a capacitor is 1 in description below.

If the output signal OSCI of the ring oscillator is at a LOW level, the node N3 is charged with Vdd−Vt (where, Vt is a threshold voltage of a NMOS transistor) by means of the NMOS transistor MN1. If the output signal OSCI of the ring oscillator is the LOW level, the logic device NR1 receives a signal, which is inverted from the output signal OSCI of the ring oscillator through the inverter INV1, and a signal, which is inverted from the output signal OSCI of the ring oscillator and delayed for a given time, through the inverters INV1, INV2 and INV3, and then outputs the signal of a LOW level. Accordingly, the capacitor C1 does not boost up the voltage of the node N3, and the node N3 has a voltage level of Vdd−Vt (where, Vt is a threshold If the output signal OSCI of the ring oscillator is inputted and a pulse has a HIGH level, the logic device NR1 outputs a signal of the HIGH level, and the voltage of the node N3 is boosted as much as $\alpha$Vdd (where, $\alpha$ is the boosting ratio, and the voltage becomes Vdd because it is assumed that $\alpha$ is 1) by means of the first capacitor C1 and thus becomes Vdd−Vt+Vdd. Accordingly, the NMOS transistor MN2 is turned on, and the first node N1 becomes the power source voltage Vdd level. Meanwhile, if the output signal OSCI of the ring oscillator is at a LOW level, the node N10 keeps a LOW level, and when the output signal OSCI of the ring oscillator is at a HIGH level, the node N10 becomes a HIGH level, and the voltage of the first node N1 is boosted by the capacitor C4, thus having a voltage level of 2*Vdd.

Meanwhile, a logic state of a voltage level of the output terminal of the logic device NR1 is set to be opposite to that of a voltage level of the node N4. That is, if the output terminal of the logic device NR1 has a voltage of a HIGH level, the node N4 is set to have a voltage of a LOW level. On the contrary, if the output terminal of the logic device NR1 has a voltage of a LOW level, the node N4 is set to have a voltage of a HIGH level.

If the output signal OSCI of the ring oscillator is at a LOW level, the logic device ND1 outputs a signal of a HIGH level, and the node N8 has a voltage of a LOW level.

If the output signal OSCI of the ring oscillator is at a HIGH level, the output terminal of the logic device NR1 has a voltage of a HIGH level, and the node N3 is boosted by means of the first capacitor C1, thus having a voltage of Vdd−Vt+Vdd. Thus, the NMOS transistor MN4 and the NMOS transistor MN5 both of which are controlled by the voltage of the node N3 are turned on, and the node N5 and the node N6 have the power source voltage Vdd level. In this time, since the output terminal of the logic device NR1 and the node N4 are set to have an opposite logic state of the voltage level, the third NMOS transistor MN3 is turned off. If the output signal OSCI of the ring oscillator is at a HIGH level, the logic device ND1 outputs a signal of a LOW level, and the node N8 has a voltage of a HIGH level. Thus, the node N5 is boosted by the capacitor C3, thus having a voltage level of 2*Vdd.

When the output signal OSCI of the ring oscillator is at a HIGH level, if the node N5 has a voltage level of 2*Vdd, the node N6 is boosted by the capacitor C2 to have a voltage level of 3*Vdd. Therefore, the gate of the driver D1, which is connected to the node N6, is applied with an oscillation voltage of 3*Vdd.

The first node N1 is made to have a voltage level of twice (2*Vdd) of an externally applied voltage by means of the charge pumping operation of the first pumping unit 130, while having a voltage of Vdd by means of the power supply unit 120. Since the gate of the driver D1, which is connected between the first node N1 and the second node N2, is applied with the oscillation voltage of 3*Vdd, the voltage of the first node N1 can be transferred to the second node N2 without a voltage drop in the driver D1. Thus, the second node N2 has a voltage level of 2*Vdd.

Meanwhile, if the externally applied voltage Vdd is a low voltage, the control signal HIGH_VDDB is fixed to a HIGH level. If the output signal OSCI of the ring oscillator is at a LOW level, the logic device NR2 logically combines a signal of the LOW level, which is delayed from the output signal OSCI of the ring oscillator through the inverters INV1, INV2, INV7 and INV8, and a signal of the LOW level, which is inverted from the control signal HIGH_VDDB through the inverter INV9, and thus outputs a signal of the HIGH level. The second node N2 is boosted by the capacitor C5, thus having a voltage level of 3*Vdd.

The NMOS transistor MN6 is turned on when the node N6 has the voltage level of 3*Vdd. Accordingly, the node N13 has the voltage level of Vdd. If the output signal OSCI of the ring oscillator is at a HIGH level, the logic device ND2 logically combines the output signal OSCI of the ring oscillator, which has passed through the first and second inverters INV1, INV2, and the output signal OSCI of the ring oscillator, which has passed through the first to fourth inverters INV1, INV2, INV3 and INV4, and then outputs a signal of a LOW level. The node N12 has a voltage of a HIGH level through the tenth inverter INV10. Accordingly, the node N13 is boosted by the capacitor C6 to have the voltage level of 2*Vdd.

Meanwhile, since the control signal HIGH_VDDB is at a HIGH level, the NMOS transistor MN8 is turned on. The PMOS transistor MP and the NMOS transistor MN7 are turn on/off in an opposite way according to a logic state of the output signal OSCI of the ring oscillator. When the PMOS transistor MP is turned on, the NMOS transistor MN7 is turned off. On the contrary, when the PMOS transistor MP is turned off, the NMOS transistor MN7 is turned on. If the output signal OSCI of the ring oscillator is at a LOW level, the NMOS transistor MN7 is turned off and the PMOS transistor MP is turned on. Thus, the node N14 has the ground voltage Vss level. If the output signal OSCI of the ring oscillator is at a HIGH level, the PMOS transistor MP is turned on and the NMOS transistor MN7 is turned off. Thus, the node N14 has the same voltage level as that of the node N13. In this time, if the node N13 is boosted to have the voltage level of 2*Vdd, even the node N14 has the voltage level of 2*Vdd. The node N14 becomes from the ground voltage Vss to the voltage level of 2*Vdd.

If the output signal OSCI of the ring oscillator is at a HIGH level, the second node N2 has the voltage level of 2*Vdd, and the NMOS transistor MN9 controlled by the node N6 is turned on. Thus, the node N15 has the voltage level of 2*Vdd. When the node N14 changes from the ground voltage Vss to the voltage level of 2*Vdd, the node N15 is boosted by the capacitor C7, thus having a voltage, which is boosted from the voltage level of 2*Vdd to the voltage level of 4*Vdd.

As described above, if the output signal OSCI of the ring oscillator is the LOW level, the second node N2 has the voltage level of 3*Vdd by means of the charge pumping operation of the second pumping unit 160. Accordingly, if the output signal OSCI of the ring oscillator becomes a HIGH level, the gate of the driver D2, which is connected between the second node N2 and the high voltage output terminal VPP, is applied with the oscillation voltage of 4*Vdd. Thus, the voltage of the second node N2 can be transferred to the high voltage output terminal VPP without a voltage drop in the driver D2.

If the externally applied voltage is over a predetermined voltage (for example, 2.5V or higher), however, the control signal HIGH_VDDB is fixed to a LOW level, and an operation accordingly is performed.

The first node N1 has a voltage level of twice (2*Vdd) of an external voltage through a charge pumping operation. The gate of the driver D1, which is connected between the first node N1 and the second node N2, is applied with a voltage of 3*Vdd regardless of an externally applied voltage. Accordingly, the voltage of the first node N1 can be transferred to the second node N2 without a voltage drop in the driver D1. The same is true of a case where the externally applied voltage is a low voltage.

Meanwhile, the second node N2 does not undergo the charge pumping operation by the second pumping unit 160 and thus keeps the voltage level of 2*Vdd. The gate of the driver D2, which is connected between the second node N2 and the high voltage output terminal VPP, is applied with an oscillation voltage of 3*Vdd. Thus, the voltage of the second node N2 can be transferred to the high voltage output terminal VPP without a voltage drop in the driver D2.

Hereinafter, the operation of the pumping circuit when an externally applied voltage Vdd is a high voltage according to an embodiment of the present invention will be described in detail.

If the output signal OSCI of the ring oscillator is at a LOW level, the node N3 is charged with Vdd−Vt (where, Vt is the threshold voltage of a NMOS transistor) by means of the NMOS transistor MN1. If the output signal OSCI of the ring oscillator is at a LOW level, the logic device NR1 logically combines a signal, which is inverted from the output signal OSCI of the ring oscillator through the inverter INV1, and a signal, which is inverted from the output signal OSCI of the ring oscillator and delayed for a given time, through the inverters INV1, INV2 and INV3, and then outputs a signal of a LOW level. Accordingly, the capacitor C1 does not boost the voltage of the node N3, and the node N3 has a voltage level of Vdd−Vt (where, Vt is the threshold voltage of a NMOS transistor) by means of the NMOS transistor MN1.

If the output signal OSCI of the ring oscillator is inputted and a pulse is at a HIGH level, the logic device NR1 outputs a signal of the HIGH level, and the node N3 is boosted as much as Vdd by means of the first capacitor C1, thus having Vdd−Vt+Vdd. Accordingly, the NMOS transistor MN2 is turned on, and the first node N1 becomes the power source voltage Vdd level. Meanwhile, when the output signal OSCI of the ring oscillator is at a LOW level, the node N10 keeps a LOW level. If the output signal OSCI of the ring oscillator becomes a HIGH level, the node N10 becomes a HIGH level, and the first node N1 is boosted by the capacitor C4 to have the voltage level of 2*Vdd.

When the output signal OSCI of the ring oscillator is at a LOW level, the logic device ND1 outputs a signal of a HIGH level, and the node N8 has a voltage of a LOW level.

If the output signal OSCI of the ring oscillator is at a HIGH level, the output terminal of the logic device NR1 has a voltage of the HIGH level, and the node N3 is boosted by the first capacitor C1 to have a voltage of Vdd−Vt+Vdd. Thus, the NMOS transistor MN4 and the NMOS transistor MN5 both of which are controlled by the voltage of the node N3 are turned on, and the node N5 and the node N6 have the power source voltage Vdd level. In this time, since the output terminal of the logic device NR1 and the node N4 are set to have an opposite logic state of a voltage level, the third NMOS transistor MN3 is turned off. When the output signal OSCI of the ring oscillator is at a HIGH level, the logic device ND1 outputs a signal of a LOW level, and the node N8 has a voltage of a HIGH level. Thus, the node N5 is boosted by the capacitor C3, thus having a voltage level of 2*Vdd.

When the output signal OSCI of the ring oscillator is at a HIGH level, if the node N5 becomes the voltage level of 2*Vdd, the node N6 is boosted by the capacitor C2, thus having a voltage level of 3*Vdd. Accordingly, the gate of the driver D1, which is connected to the node N6, is applied with an oscillation voltage of 3*Vdd.

The first node N1 has the voltage of Vdd by means of the power supply unit 120, and is then made to have a voltage level of twice (2*Vdd) of an externally applied voltage by means of a charge pumping operation of the first pumping unit 130. The gate of the driver D1, which is connected between the first node N1 and the second node N2, is applied with an oscillation voltage of 3*Vdd. Thus, the voltage of the first node N1 can be transferred to the second node N2 without a voltage drop in the driver D1. Accordingly, the second node N2 has the voltage level of 2*Vdd.

If the externally applied voltage is a high voltage, the control signal HIGH_VDDB is fixed to a LOW level, and the control signal HIGH_VDDB is inverted through the inverter INV9 and is then inputted to the logic device NR2. Thus, the node N11 always has a voltage of a LOW level. Accordingly, a boosting operation by means of the capacitor C5 does not occur, and the second node N2 maintains the voltage level of 2*Vdd.

Since the control signal HIGH_VDDB is at a LOW level, the NMOS transistor MN8 is turned off. When the output signal OSCI of the ring oscillator is at a HIGH level, the NMOS transistor MN6 is turned on since the node N6 has the voltage level of 3*Vdd. Accordingly, the node N13 has a voltage level of Vdd. When the output signal OSCI of the ring oscillator is at a HIGH level, the logic device ND2 logically combines the output signal OSCI of the ring oscillator, which has passed through the inverters INV1, INV2, and the output signal OSCI of the ring oscillator, which has passed through the inverters INV1, INV2, INV3 and INV4, and thus outputs a signal of a LOW level. Accordingly, since the signal of the LOW level is inverted through the inverter INV10, the node N12 has a voltage of a HIGH level. Accordingly, the node N13 is boosted by the capacitor C6 and thus has a voltage level of 2*Vdd. Further, when the output signal OSCI of the ring oscillator is at a HIGH level, the PMOS transistor MP is turned on, and the node N14 has the same voltage level as that of the node N13. Thus, the node N14 has the voltage level of 2*Vdd.

When the output signal OSCI of the ring oscillator is at a HIGH level, the second node N2 has a voltage level of 2*Vdd, and the NMOS transistor MN9 controlled by the node N6 is turned on. Thus, the node N15 has the voltage level of 2*Vdd. In this time, if the node N14 is boosted to the voltage level of 2*Vdd, the node N15 is boosted by the capacitor C7 to have a voltage, which is boosted from the voltage level of 2*Vdd to the voltage level of 3*Vdd. Accordingly, the second node N2 has the voltage level of 2*Vdd, and the gate of the driver D2, which is connected between the second node N2 and the high voltage output terminal VPP, is applied with an oscillation voltage of 3*Vdd. As a result, the voltage level of 2*Vdd can be outputted to the high voltage output terminal VPP without a voltage drop in the driver D2

The pumping circuit of the semiconductor device according to a second preferred embodiment of the present invention will be below described.

Referring to FIG. 3, the pumping circuit of the semiconductor device according to the second embodiment of the present invention.

The pumping circuit of the second embodiment is the same as that of the first embodiment except that the control signal HIGH-VDDB is inputted to the gate of the NMOS transistor MN7, and the output signal OSCI of the ring oscillator is inputted to the gate of the NMOS transistor MN8 via the inverter INV1.

The operation of the pumping circuit of the semiconductor device according to the second embodiment of the present invention is the same as that of the first embodiment except for the operation in the second pump control unit 170. Hereinafter, the operation of the pumping circuit of the semiconductor device according to the second embodiment of the present invention will be described. Since the operation of the pumping circuit according to the second embodiment is the same as that of the pumping circuit according to the first embodiment except for the operation of the second pump control unit 170, only the operation in the second pump control unit 170 will be described.

If the externally applied voltage Vdd is a low voltage, the control signal HIGH_VDDB is fixed to a HIGH level.

The NMOS transistor MN6 is turned on when the node N6 has a voltage level of 3*Vdd. Thus, the node N13 has a voltage level of Vdd. When the output signal OSCI of the ring oscillator is at a HIGH level, the logic device ND2 logically combines the output signal OSCI of the ring oscillator, which has passed through the first and second inverters INV1, INV2, and the output signal OSCI of the ring oscillator, which has passed through the first to fourth inverters INV1, INV2, INV3 and INV8, and then outputs a signal of a LOW level. The node N12 has a voltage of a HIGH level through the tenth inverter INV10. Accordingly, the node N13 is boosted by the capacitor C6, and thus has a voltage level of 2*Vdd.

Meanwhile, since the control signal HIGH_VDDB is at a HIGH level, the NMOS transistor MN7 is turned on. The NMOS transistor MN8 is turned on/off according to a logic state of the output signal OSCI of the ring oscillator. The PMOS transistor MP has the gate to which the Vdd voltage of a HIGH level, which is the control signal HIGH_VDDB, is applied. The node N13 corresponding to the source of the PMOS transistor MP has a voltage level of 2*Vdd. That is, the gate of the PMOS transistor MP is applied with the voltage of Vdd, and the source thereof is applied with the voltage of 2*Vdd. Thus, the PMOS transistor MP is turned on. Accordingly, when the NMOS transistor MN8 is turned on, the PMOS transistor MP is turned on. Thus, the node 14 has the voltage level of 2*Vdd, which is the same as that of the node N13. That is, the node N14 becomes from a ground voltage Vss to the voltage level of 2*Vdd.

When the output signal OSCI of the ring oscillator is at a HIGH level, the second node N2 has the voltage level of 2*Vdd, and the NMOS transistor MN9 controlled by the node N6 is turned on. Thus, the node N15 has the voltage level of 2*Vdd. When the node N14 becomes from the ground voltage Vss to the voltage level of 2*Vdd, the node N15 is boosted by the capacitor C7 to have a voltage, which is boosted from the voltage level of 2*Vdd to a voltage level of 4*Vdd.

As described in the first embodiment, when the output signal OSCI of the ring oscillator is at a LOW level, the second node N2 has a voltage level of 3*Vdd by means of a charge pumping operation of the second pumping unit 160. Accordingly, if the output signal OSCI of the ring oscillator becomes a HIGH level, the gate of the driver D2, which is connected between the second node N2 and the high voltage output terminal VPP, is applied with an oscillation voltage of 4*Vdd. Accordingly, the voltage of the second node N2 can be transferred to the high voltage output terminal VPP without a voltage drop in the driver D2.

If an externally applied voltage is a high voltage, since the control signal HIGH_VDDB is at a LOW level, the NMOS transistor MN7 is turned off, and the PMOS transistor MP is turned on. Accordingly, the NMOS transistor MN8 is turned on/off according to a logic state of the output signal OSCI of the ring oscillator. If the output signal OSCI of the ring oscillator is at a HIGH level, the NMOS transistor MN6 is turned on since the node N6 has a voltage level of 3*Vdd. Accordingly, the node N13 has a voltage level of Vdd. If the output signal OSCI of the ring oscillator is at a HIGH level, the logic device ND2 Logically combines the output signal OSCI of the ring oscillator, which has passed through the inverters INV1, INV2, and the output signal OSCI of the ring oscillator, which has passed through the inverters INV1, INV2, INV3 and INV8, and then outputs a signal of a LOW level. As such, since the signal of the LOW level is inverted through the inverter INV10, the node N12 has a voltage of a HIGH level. Accordingly, the node N13 is boosted by the capacitor C6. and thus has a voltage level of 2*Vdd. Since the PMOS transistor MP is turned on and the NMOS transistor MN7 is turned off, the node N14 has the same voltage level as that of the node N13. Thus, the node N14 has a voltage level of 2*Vdd. In other words, since the PMOS transistor MP is turned on, the node N14 has the voltage level of Vdd, but if the node N13 has the voltage level of 2*Vdd, it has a voltage level of 2*Vdd in the same manner.

If the output signal OSCI of the ring oscillator is at a HIGH level, the second node N2 has a voltage level of 2*Vdd, and the NMOS transistor MN9 controlled by the node N6 is turned on. Thus, the node N15 has a voltage level of 2*Vdd. In this time, if the node N14 becomes a voltage level of 2*Vdd, the node N15 is boosted by the capacitor C7, and thus has a voltage, which is boosted from the voltage level of 2*Vdd to a voltage level of 3*Vdd. Accordingly, the second node N2 has the voltage level of 2*Vdd. and the gate of the driver D2, which is connected between the second node N2 and the high voltage output terminal VPP, is applied with an oscillation voltage of 3*Vdd. As a result, the voltage level of 2*Vdd can he transferred to the high voltage output terminal VPP without a voltage drop in the driver D2.

As described above, if an externally applied voltage is a high voltage, the pumping operation by the first transfer pump 10 is generated, the pumping operation is not generated in the second transfer pump 150, but only on/off operations are generated, and the output voltage Vpp becomes the level of twice (2*Vdd) of the externally applied voltage.

As described above, the pumping circuit according to a preferred embodiment of the present invention can perform a two-step pumping operation and one-step pumping operation in parallel depending on the level of an externally applied voltage, and can operate at a pumping voltage Vpp level without a voltage drop by the drivers D1 and D2. Accordingly, a pumping circuit of high efficiency can be fabricated.

As described above, according to a pumping circuit of a semiconductor device in accordance with the present invention, if an externally applied voltage detected by a voltage level detector is below a predetermined voltage, a first transfer pump and a second transfer pump performs a two-step pumping operation without a voltage drop in the first transfer pump and the second transfer pump. If the externally applied voltage detected by the voltage level detector is over a predetermined voltage, the first transfer pump performs a one-step pumping operation without a voltage drop in the first transfer pump, and the second transfer pump performs only an on/off operation without a voltage drop, thus outputting a high voltage to a high voltage output terminal. Accordingly, the present invention is advantageous in that the pumping circuit consumes less current and operates at high efficiency.

Although the foregoing description has been made with reference to the preferred embodiments, it is to be understood that changes and modifications of the present invention may be made by the ordinary skilled in the art without departing from the spirit and scope of the present invention and appended claims.

What is claimed is:

1. A pumping circuit of a semiconductor device, comprising:
    a first transfer pump for transferring a voltage at a first electric potential of a first node to a second node;
    a power supply unit for supplying a power source voltage to the first node;
    a first pumping unit coupled to the first node for pumping the power source voltage applied to the first node;
    a first pump control unit for controlling a voltage applied to a gate of the first transfer pump;
    a second pumping unit coupled to the second node for selectively pumping a second electric potential of the second node;
    a second transfer pump for transferring the voltage at the second electric potential of the second node to a high voltage output terminal; and
    a second pump control unit for controlling a voltage applied to a gate of the second transfer pump, wherein if the power source voltage is higher than a predetermined voltage, the first pumping unit performs a pumping operation, and the second pumping unit does not perform a pumping.

2. The pumping circuit as claimed in claim 1, wherein if the power source voltage detected by a voltage level detector is lower than the predetermined voltage, the first pumping unit and the second pumping unit perform pumping operations, thus outputting second electric potential pumped by the second pumping unit to the high voltage output terminal, and if the power source voltage detected by the voltage level detector is higher than the predetermined voltage, the first pumping unit performs the pumping operation, and the second pumping unit does not perform a pumping operation, thus outputting the second electric potential pumped by the second pumping unit to the high voltage output terminal.

3. The pumping circuit as claimed in claim 1, wherein an output terminal of the first pumping unit and an output terminal of the second pumping unit are set to have an opposite logic state of a voltage level.

4. The pumping circuit as claimed in claim 1, wherein an output terminal of the first pump control unit and an output terminal of the second pump control unit are set to have an opposite logic state of a voltage level.

5. The pumping circuit as claimed in claim 1, wherein the first transfer pump comprises a driver having a drain terminal connected to the first node, a source terminal connected to the second node, and a gate terminal connected to an output terminal of the first pump control unit.

6. The pumping circuit as claimed in claim 1, wherein the second transfer pump comprises a driver having a source terminal connected to the high voltage output terminal, a drain terminal connected to the second node and a gate terminal connected to an output terminal of the second pump control unit.

7. The pumping circuit as claimed in claim 1, wherein the power supply unit comprises:
 a logic device for logically combining an inverted signal of an output signal of a ring oscillator and a signal, which is delayed and inverted from the output signal of the ring oscillator;
 a capacitor connected between an output terminal of the logic device and a third node;
 a first NMOS transistor connected between a power source voltage terminal and the third node; and
 a second NMOS transistor connected between the power source voltage terminal and the first node and having a gate connected to the third node.

8. The pumping circuit as claimed in claim 7, wherein the logic device is a NOR gate, and the NOR gate receives the inverted signal of the output signal of the ring oscillator and the signal, which is inverted from the output signal of the ring oscillator and delayed for a given time, as the input.

9. The pumping circuit as claimed in claim 7, wherein the first NMOS transistor is a diode having a gate terminal and a drain terminal connected to the power source voltage terminal.

10. The pumping circuit as claimed in claim 1, wherein the first pumping unit comprises:
 first to third inverters that receive a delayed and inverted signal of an output signal of a ring oscillator, the first to third inverters being connected in a serial manner; and
 a capacitor connected to the first node and an output terminal of the third inverter.

11. The pumping circuit as claimed in claim 1, wherein the first pump control unit comprises:
 a first NMOS transistor connected between a ground voltage terminal and a third node, the first NMOS transistor being controlled according to a first signal, which is delayed from an output signal of a ring oscillator for a given time;
 a second NMOS transistor connected between a power source voltage terminal and a fourth node and having a gate connected to the power supply unit;
 a third NMOS transistor connected between the power source voltage terminal and the third node and having a gate terminal connected to the power supply unit;
 a first capacitor connected between the third node and the fourth node;
 a first capacitor connected between the third node and the fourth node;
 a logic device for logically combining a second signal, which is an inverted signal of the output signal of the ring oscillator and a third signal which is delayed and inverted from the output signal of the ring oscillator;
 an inverter connected between an output terminal of the logic device and a fifth node; and
 a second capacitor connected between the third node and the fifth node.

12. The pumping circuit as claimed in claim 11, wherein the first pump control unit further comprises:
 first and second inverters connected between a terminal to which the output signal of the ring oscillator is inputted and a gate terminal of the first NMOS transistor in a serial manner; and
 a third inverter connected between an output terminal of the second inverter and an input terminal of the logic device.

13. The pumping circuit as claimed in claim 11, wherein the logic device is a NAND gate, and the NAND gate receives the second signal and the third signal, as the input.

14. The pumping circuit as claimed in claim 1, wherein the second pumping unit comprises:
 a logic device for receiving a signal, which is delayed from an output signal of a ring oscillator for a given time, and an inverted signal of a control signal, as the input; and
 a capacitor connected between an output terminal of the logic device and the second node.

15. The pumping circuit as claimed in claim 14, wherein the second pumping unit further comprises:
 a first inverter for receiving a signal, which is inverted from the output signal of the ring oscillator and delayed for a given time, as the input, and then outputting the inverted and delayed signal to one input terminal of the logic device; and
 a second inverter for inverting the control signal and outputting the inverted control signal to another input terminal of the logic device.

16. The pumping circuit as claimed in claim 1, wherein the second pump control unit comprises:
 a logic device for logically combining a first signal which is a first delayed output signal of a ring oscillator and a second signal, which is a delayed signal of the first signal;
 an inverter for receiving an output signal of the logic device as an input;
 a first capacitor connected between an output terminal of the inverter and a third node;
 a first NMOS transistor connected between a power source voltage terminal and the third node and having a gate connected to an output terminal of the first pump control unit;
 a PMOS transistor connected between the third node and a fourth node, the PMOS transistor being controlled according to an inverted signal of the output signal of the ring oscillator;
 second and third NMOS transistors connected between the fourth node and a ground voltage terminal in a serial manner, wherein the second and third NMOS transistors are controlled according to the inverted signal of the output signal of the ring oscillator and a control signal, respectively;
 a second capacitor connected between the fourth node and a fifth node; and
 a fourth NMOS transistor connected between the second node and the fifth node and having a gate connected to the output terminal of the first pump control unit.

17. The pumping circuit as claimed in claim 16, wherein the logic device is a NAND gate, and receives the first signal and the second signal, which is more delayed than the first signal from the output signal of the ring oscillator, as the input.

18. The pumping circuit as claimed in claim 1, wherein the second pump control unit comprises:
- a logic device for logically combining a fist signal, which is a first delayed output signal of a ring oscillator and a second signal, which is a delayed signal of the first signal;
- an inverter for receiving an output signal of the logic device as an input;
- a first capacitor connected between an output terminal of the inverter and a third node;
- a first NMOS transistor connected between a power source voltage terminal and the third node and having a gate connected to an output terminal of the first pump control unit;
- a PMOS transistor connected between the third node and a fourth node, the PMOS transistor being controlled according to a control signal;
- second and third NMOS transistors connected between the fourth node and a ground voltage terminal in a serial manner, wherein the second and third NMOS transistors are controlled according to the control signal and an inverted signal of the output signal of the ring oscillator, respectively;
- a second capacitor connected between the fourth node and a fifth node; and
- a fourth NMOS transistor connected between the second node and the fifth node and having a gate connected to the output terminal of the first pump control unit.

19. The pumping circuit as claimed in claim 18, wherein the logic device is a NAND gate, and receives the first signal and the second signal, which is more delayed than the first signal from the output signal of the ring oscillator, as the input.

20. The pumping circuit as claimed in claim 1, wherein if the power source voltage detected by a voltage level detector is lower than the predetermined voltage, the power supply unit and the first pumping unit operate so that the first node has the first electric potential, which is twice as high as the power source voltage by operation of the first pumping unit, the first transfer pump transfers the first electric potential of the first node to the second node under the control of the first pump control unit, the second pumping unit operates so that the second node has the second electric potential, which is three times as high as the power source voltage by operation of the second pumping unit, and the second transfer pump transfers the second electric potential of the second node to the high voltage output terminal under the control of the second pump control unit, and if the power source voltage detected by the voltage level detector is higher than the predetermined voltage, the power supply unit and the first pumping unit operate so that the first node has the first electric potential, which is twice as high as the power source voltage by operation of the first pumping unit, the first transfer pump transfers the first electric potential of the first node to the second node under the control of the first pump control unit, the second pumping unit does not perform a pumping operation so that the second node has the second electric potential, which is twice as high as the power source voltage, and the second transfer pump transfers the second electric potential of the second node to the high voltage output terminal under the control of the second pump control unit.

21. A pumping circuit of a semiconductor device, comprising:
- a power supply unit for supplying a power source voltage to a first node;
- a first transfer pump for transferring a first electric potential of the first node to a second node;
- a first pumping unit coupled to the first node for pumping the power source voltage applied to the first node;
- a first pump control unit for controlling a voltage applied to a gate of the first transfer pump;
- a second transfer pump for transferring a second electric potential of the second node to a high voltage output terminal;
- a second pumping unit coupled to the second node for selectively pumping the second electric potential of the second node; and
- a second pump control unit for controlling a voltage applied to a gate of the second transfer pump in response to the power source voltage level, wherein if the power source voltage is higher than a predetermined voltage, the first pumping unit performs a pumping operation, and the second pumping unit does not perform a pumping operation.

22. The pumping circuit as claimed in claim 21, wherein the second pumping unit is controlled according to a control signal depending on a detection of the power source voltage level.

23. The pumping circuit as claimed in claim 21, wherein the second pump control unit is controlled according to a control signal depending on a detection of the power source voltage level.

* * * * *

UNITED STATES PATENT AND TRADEMARK OFFICE
CERTIFICATE OF CORRECTION

PATENT NO. : 7,276,959 B2
APPLICATION NO. : 11/046128
DATED : October 2, 2007
INVENTOR(S) : Kwang Jun Cho et al.

Page 1 of 1

It is certified that error appears in the above-identified patent and that said Letters Patent is hereby corrected as shown below:

In the Claims:

At Column 14, line 49, "pumping." should be -- pumping operation. --.

At Column 14, line 54, "outputting second" should be -- outputting the second --.

At Column 14, line 60, "pumped" should be -- unpumped --.

At Column 15, line 11, "node" should be -- node, --.

At Column 15, lines 60-61, please delete the occurrence of "a first capacitor connected between the third node and the fourth node;" .

At Column 15, line 64, "signal" should be -- signal, --.

Signed and Sealed this

Twenty-second Day of July, 2008

JON W. DUDAS
*Director of the United States Patent and Trademark Office*